Sept. 22, 1970         V. A. MEZHEKOV ET AL         3,529,891
                SLIDE PROJECTOR TO SHOW FRAMED SLIDES
Filed Dec. 29, 1967                               6 Sheets-Sheet 1

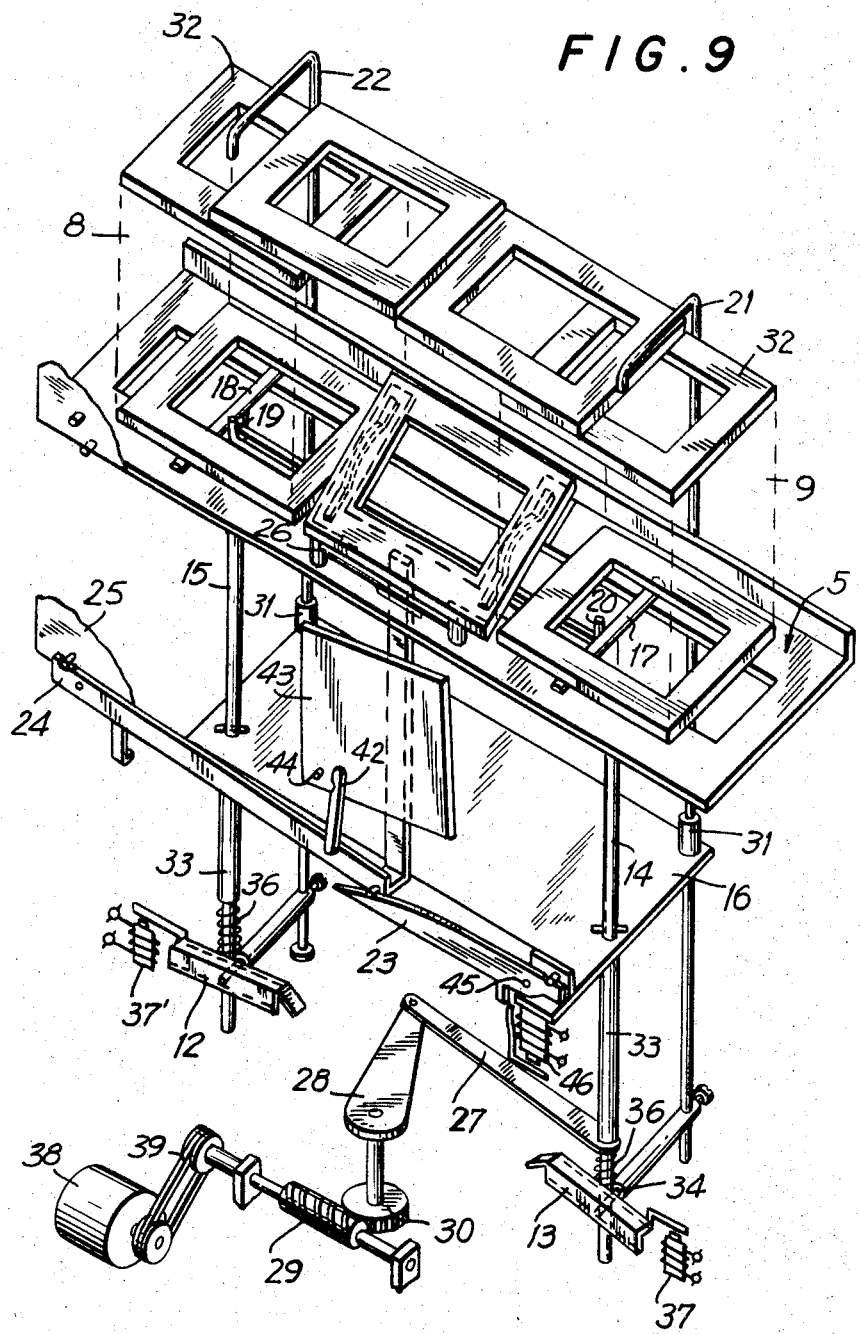

ns and Patent Office
United States Patent Office
3,529,891
Patented Sept. 22, 1970

3,529,891
SLIDE PROJECTOR TO SHOW
FRAMED SLIDES
Valerian Alexeevich Mezhekov, Ulitsa Marshala Birjuzova 41, kv. 88, and Alexandr Alexandrovich Zolotarev, Leningradsky prospect 28, kv. 191a, both of Moscow, U.S.S.R.; Viktor Ivanovich Savinkov, Komitetsky Les, poselok Rostokino 10, kv. 2, Kaliningrad, Moskovskoi oblasti, U.S.S.R.; and Mikhail Pavlovich Rudenko, Ulitsa Marshala Birjuzova 4, korpus 1, kv. 41; Jury Mikhailovich Pisarevsky, Ulitsa Mashi Poryvaevoi 33, kv. 21; Nikolai Ivanovich Kostyaev, Gruzinsky val. 16, kv. 3; and Maxim Yakovlevich Ivanov, Ulitsa Zhivopisnaya 13, korpus 1, kv. 52, all of Moscow, U.S.S.R.
Filed Dec. 29, 1967, Ser. No. 694,437
Claims priority, application U.S.S.R., Dec. 31, 1966, 1,120,507
Int. Cl. G03b 23/02
U.S. Cl. 353—113                                        3 Claims

ABSTRACT OF THE DISCLOSURE

A slide projector is provided with a slide holder extending perpendicular to the optical axis of the projector and having wells on opposite sides of the axis for stacking mounted slides in a horizontal position. The slide holder has an aperture between the wells, and a slide in either stack is individually moved from its well by a pusher member to the picture aperture, the overlying slides in the stacks being raised by cross-pieces so that the selected slide can be turned to a vertical position perpendicular to the optical axis for projection. The slides can be fed in succession from one well to another for a continuous showing in a closed cycle.

---

The present invention relates to projection devices and more particularly to slide projectors designed to show slides in frames of a varying size and used for different purposes (in show and review projectors, decoders, etc.), as well as ensuring both individual and continuous show of slides on a closed cycle, selection of a desired picture frame and accompaniment by music.

Known in the art are slide projectors designed to show framed or mounted slides, in which the frames with slides stacked in the wells of the slide holder are brought from one well to a picture aperture provided between the wells, being then fed on a closed cycle to another well with the aid of a frame feeder.

The known slide projectors are difficult to build, inconvenient in use and do not permit change of a picture frame in both directions, while a continuous show of slides on a closed cycle is only possible when the wells are all full of slides.

It is an object of the present invention to provide a slide projector for showing framed slides, which is small in size, easy to build and convenient in use.

Another object of the invention is to provide a slide projector to show framed slides, which permits the showing of individual slides either in one or in both directions.

Another object of the invention is to provide a slide projector to show framed slides, which permits a continuous show of slides on a closed cycle in the case where the framed slides occupy more than a half of said wells' space.

A further object of the present invention is to provide a slide projector for showing framed slides, which permits selection of any picture frame for showing.

And, finally, the present invention aims at providing a slide projector to show framed slides, which permits an automatic show of slides from a time relay and a tape-recorder.

According to the afore-mentioned and other objects, the slide-holder in the proposed projector for showing framed slides has wells adapted to hold frames in a horizontal position and to move them in this position with the aid of a frame feeder which has command members for either well permitting variation of the direction of said frames motion, as well as a means to turn the frames into a position at which the slide in the picture aperture becomes perpendicular to the optical axis.

It is feasible that the command members, preferably, templates, be kinematically coupled with rods secured on a common traveling carriage and carrying crosspieces to elevate a pile of frames in either of the wells, lower pushers to feed the frames to the picture aperture and upper pushers to transfer the frames from one well into the other.

The means for turning the frames into a position at which the slide in the picture aperture becomes perpendicular to the optical axis, can be arranged as a command member, preferably, a template, secured on a traveling carriage and interacting with a shaped lever secured on the frame feeder footing and kinematically coupled with a fork-type lever secured on the same footing.

The slide projector thus designed can work in different operating conditions, is simpler mechanically and easier to load.

Other objects and advantages of the present invention will become more apparent from the following description of an exemplary embodiment with reference to the appended drawings, wherein:

FIGS. 8 and 9 are perspective views of the frame feeder and of a means designed to turn frames into a position at which the slide in a picture aperture become perpendicular to the optical axis of the slide projector.

Figure 1:
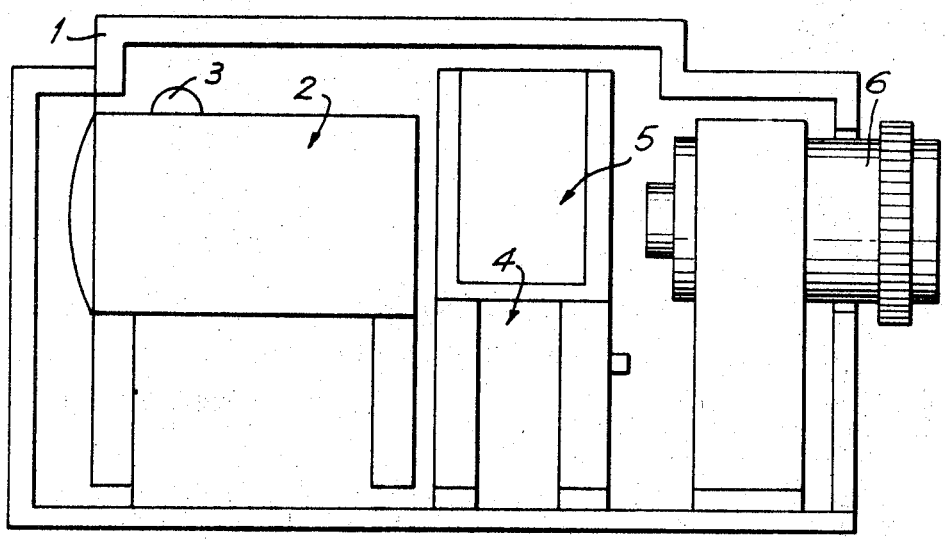
FIG. 1 is a side view diagrammatically showing the slide projector of the invention.
Figure 3:
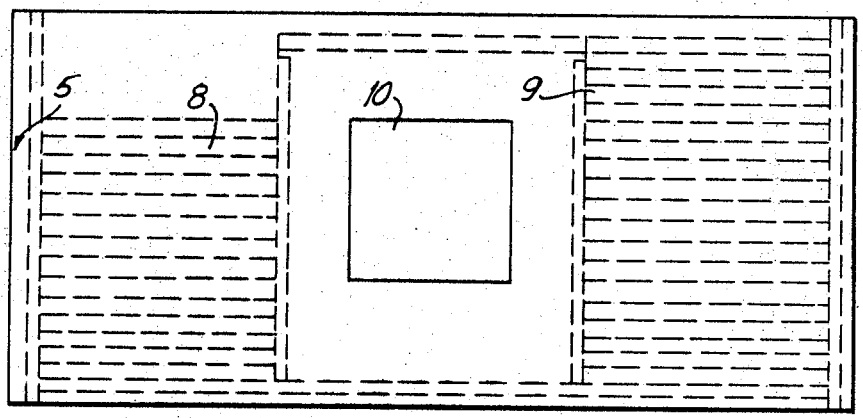
FIG. 3 is a side view of a slide holder provided in the slide projector of the invention, with a conventional denotation of framed slides.
Figure 2:
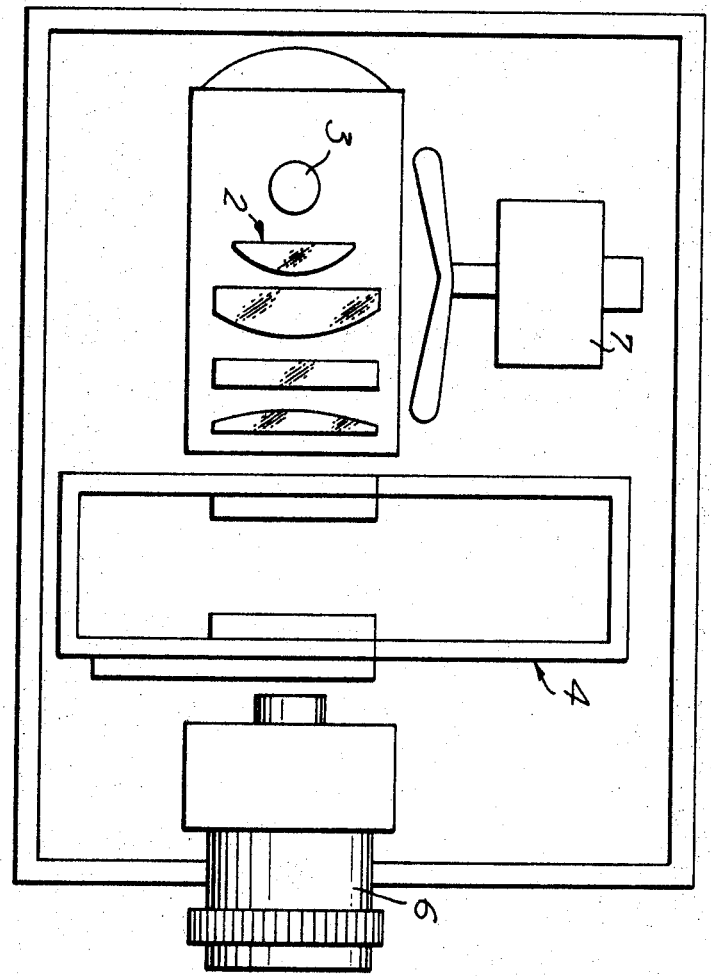
FIG. 2 is a plan view of the projector.
Figure 4:
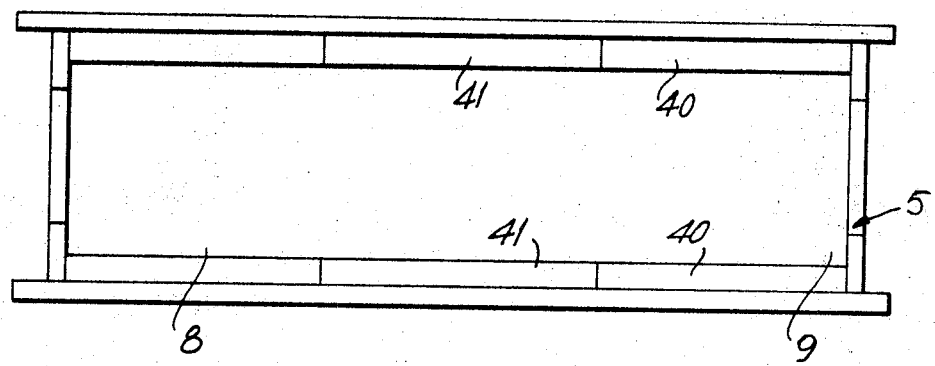
FIG. 4 is a plan view of the holder.
Figure 5:
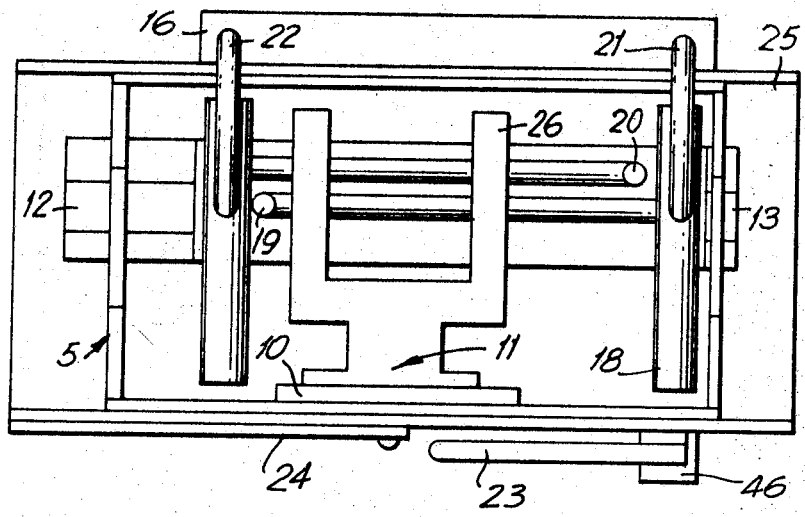
FIG. 5 is a plan view of a frame feeder provided in the slide projector of the invention.

According to the invention, the slide projector comprises a condenser 2 with a light source 3, a frame feeder 4, a slide holder 5, a lens 6 and a cooling unit 7, all enclosed in a casing 1 (FIGS. 1 and 2). Framed slides are stacked in piles in wells 8 and 9 (FIGS. 3 and 4) of the slide holder 5 and are fed from either of the wells 8 or 9 to a picture aperture 10 provided between said wells 8 and 9, being then transfererd on a closed cycle to the other well 9 or 8 with the aid of the frame feeder 4. The frames with slide are shown conventionally dotted in FIG. 3. The slide holder 5 has the wells 8 and 9 adapted to hold frames in a horizontal position and to move them in this position with the aid of the frame feeder 4 having command members for either of the wells 8 and 9 which permit variation of the direction of the frame motion, as well as a means 11 (FIG. 5) to turn the frames into a position in which the slide in the picture aperture 10 becomes perpendicular to the optical axis.

Figure 6:
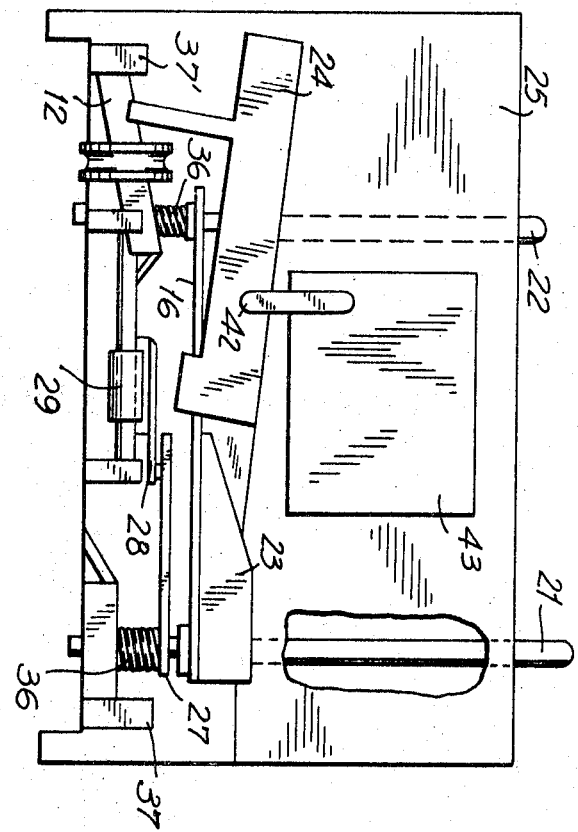
FIG. 6 is a front view of the frame feeder.
Figure 7:
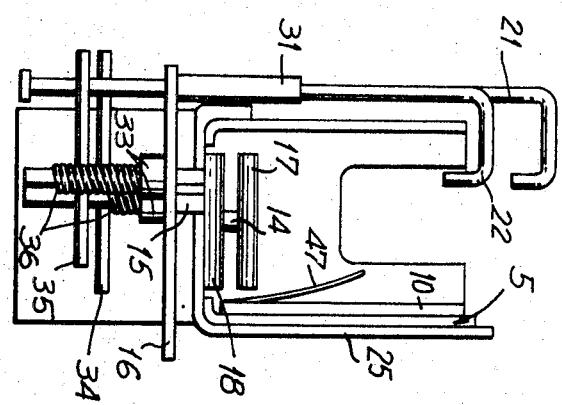
FIG. 7 is a side view of the frame holder.

In the proposed slide projector, the command members are fashioned as templates 12 and 13 (FIG. 6) kinematically coupled with rods 14 and 15 (FIG. 7) secured on a common traveling carriage 16 and carrying crosspieces 17 and 18 to elevate a pile of frames in either well 8 or 9, lower pushers 19 and 20 (FIG. 5) to feed frames to the picture aperture 10 and upper pushers 21 and 22 to transfer frames from one well 8 or 9 to the other 9 or 8.

The means 11 for turning frames into a position at which the slide in the picture aperture 10 becomes perpendicular to the optical axis is fashioned as a command member made as a template 23 (FIGS. 5 and 6) secured on a traveling carriage 16 and interacting with a shaped lever 24 secured on a footing 25 of the frame feeder 4 and kinematically coupled with a fork-type lever 26 (FIG. 5) fastened to the same footing. The footing 25 has a rectangular slot on the side of condenser 2 with which the picture aperture 10 of the slide holder 5 is matched.

The traveling carriage 16 is connected, via a link rod 27 (FIGS. 8 and 9) with a crank 28 of a worm gear comprising a worm 29 and a gear 30 in mesh as a worm pair. From this drive said carriage 16 travels along guides (not shown in the drawing) secured on the footing 25. Moving along guides 31 are the upper pushers 21 and 22 of frames 32 and traveling along guides 33 are the rods 14 and 15 the carrying crosspieces 17 and 18, the lower pushers 19 and 20 of the frames 32 and cams 34 and 35 of the frame feeder 4.

Spring 36 (FIGS. 6, 8 and 9) retain the pushers 19, 20, 21 and 22, the rods 14 and 15 with the crosspieces 17 and 18 and the cams 34 and 35 in a lower position.

Figure 8:
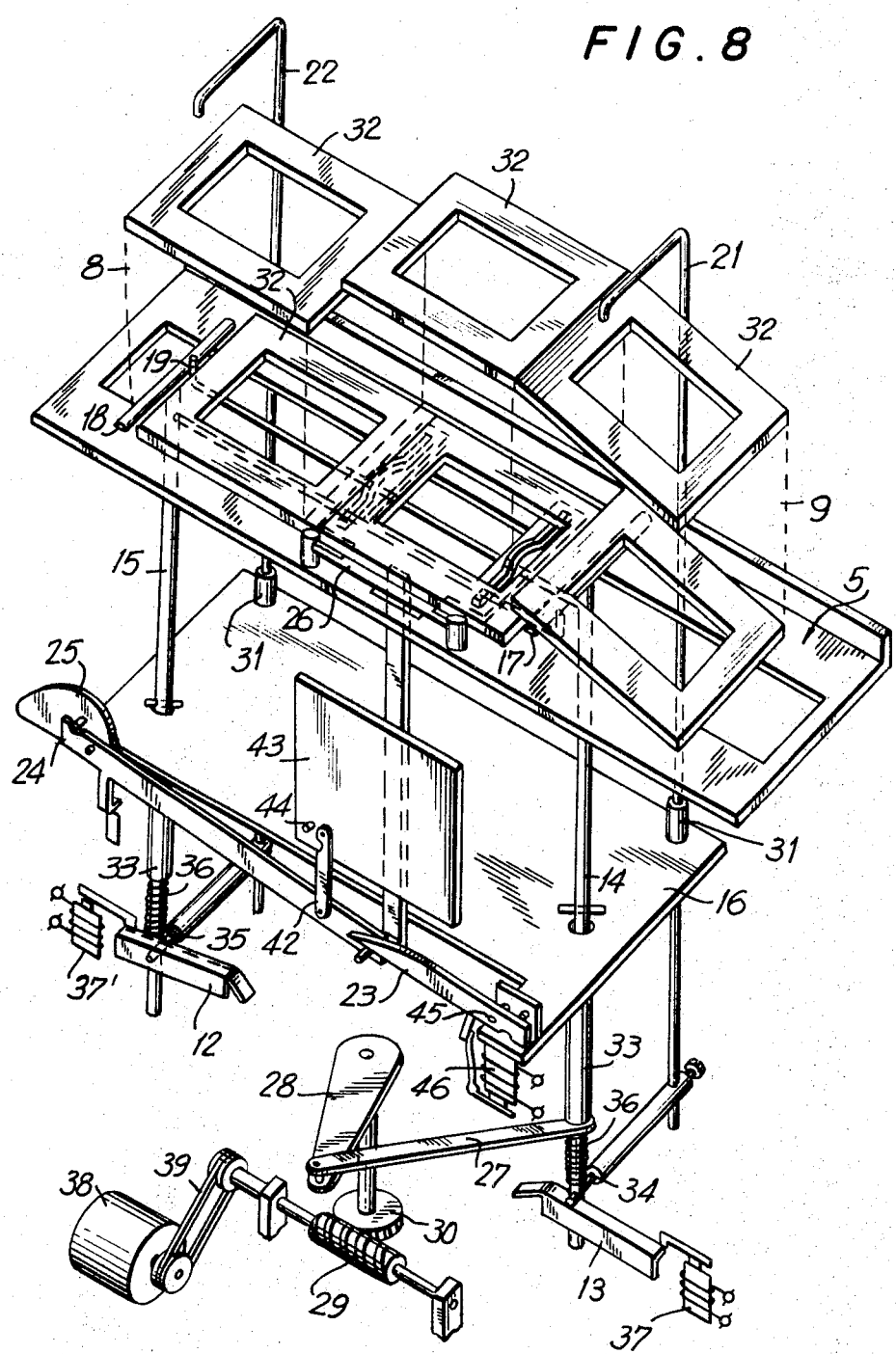

According to the invention, the slide projector is operated as follows:

The templates 12 and 13 are in the upper position and lowered to feed the frames 32 from one well 8 or 9 to the other well 9 or 8 respectively with the aid of electromagnets 37 or 37¹ (FIGS. 8 and 9).

An electric motor 38 drives the worm pair via a pulley 39 via the crank 28 and the link rod 27 the carriage 16 undergoes reciprocal motion. In the course of the template 13, lowering, the rod 14 with the crosspiece 17 rises, with the aid of the cam 34, along said template and lifts the pile of frames 32 above the crosspiece 17. The pusher 21 secured on the rod 14 transfers the lower frame 32 from the well 8 toward the elevated pile along guides 40 (FIG. 4) of the slide holder 5. Along the guides 40 and 41 the frames 32 are transferred from one well 8 to the other well 9. The lower frame 32 moves until it finds itself under the picture aperture 10. Then a command device (not shown in the drawing) moves the shaped lever 24 by means of the template 23. In its turn said shaped lever 24 moves the fork-type lever 26 which turns the frame 32 available under the picture aperture toward said aperture. On becoming turned, the frame 32 becomes pressed against the picture aperture 10. Simultaneously with the elevation of the frame 32 a link 42 (FIGS. 8 and 9) hinged to the shaped lever 24 acts on a plate 43 (FIGS. 6, 8 and 9) turning it around an axis 44, thus opening the picture aperture 10. In the course of a successive change of the frames 32, the command device turns the template 23 around a hinge 45 (FIGS. 8 and 9) by means of an electromagnet 46 and somewhat elevates said template. The elevated template 23 acts on the shaped lever 24 and lowers it into the initial position. The plate 43 closes the picture aperture 10. The lowering of the shaped lever 24 is accompanied by the lowering of the fork-type lever 26. A spring 47 (FIG. 7) fixed at the picture aperture 10 gets on the frame 32, thus lowering it on the guides 40 of the slide holder 5. Thereafter the template 13 is lowered, and the cam 34 with the rod 14 and the crosspiece 17 rises along said template, etc.

In case one of the wells 9 is overfilled, the pusher 21 acts on the uppermost frame 32 and moves it along the guides 41 until it occupies the position above the picture aperture 10. In the course of a further overfilling, the frame 32 available above the picture aperture 10 is forced by the pusher 21 into the well 8 by means of the other upper frame 32, thus closing a round cycle.

To ensure a reverse motion of the frames 32, the template 12 must be lowered. The operational principle is the same.

The slide projector of the invention permits showing slides both in one and two directions on a closed cycle, allowing selection of any desired picture frame and operation from a time relay and a tape-recorder.

Although the present invention has been described with reference to an exemplary embodiment thereof, various alterations and modifications can be made without departing from the spirit and scope of the invention, as those skilled in the art will readily understand.

What we claim is:

1. A slide projector to show framed slides, which comprises: a casing; a condenser with a light source in said casing arranged along an optical axis; a slide holder arranged perpendicular to said optical axis after said condenser and having wells adapted to hold said frames with piled slides in a horizontal position, said slide holder having a picture aperture between said wells; means to move said frames in a horizontal position from one of said wells to said picture aperture and subsequently to the other of said wells in a closed cycle, said means including command members for either of said wells, which permit variation of the direction of frame motion; means to turn said frames into a position in which the slide in said picture aperture becomes perpendicular to the optical axis; and a lens within whose focus said picture aperture is arranged.

2. A slide projector as claimed in claim 1 comprising crosspieces for elevation of a pile of said frames in each of said wells, a common traveling carriage for said crosspieces, rods secured to said carriage, said command members being coupled to said rods, lower pushers to feed said frames to said picture aperture and upper pushers to transfer said frames from one of said wells to the other.

3. A slide projector as claimed in claim 2, in which said means for turning said frames into a position at which the slide in said picture aperture becomes perpendicular to the optical axis, comprises an actuator member secured on said traveling carriage, a shaped lever secured on said means for moving said frames and interacting with said actuator, and a fork-type lever coupled to said shaped lever for being activated thereby to turn a slide at the picture aperture perpendicular to the optical axis.

References Cited

UNITED STATES PATENTS

| 2,476,797 | 7/1949 | Bennet et al. | 353—112 |
| 2,634,653 | 4/1953 | Barth | 353—113 |

FOREIGN PATENTS

| 229,736 | 8/1959 | Australia. |

HARRY N. HAROIAN, Primary Examiner

U.S. Cl. X.R.

353—104, 116